United States Patent [19]

Newhouse et al.

[11] Patent Number: 4,778,871

[45] Date of Patent: Oct. 18, 1988

[54] HIGH TEMPERATURE INSULATORS

[75] Inventors: James P. Newhouse; Robert A. Rhein, both of Ridgecrest, Calif.

[73] Assignee: The United States of America as represented by the Secretary of the Navy, Washington, D.C.

[21] Appl. No.: 89,120

[22] Filed: Aug. 25, 1987

[51] Int. Cl.$^4$ .............................................. C08G 77/06
[52] U.S. Cl. ........................................ 528/18; 528/28; 528/31; 528/32; 528/35; 525/478
[58] Field of Search ...................... 528/35, 28, 18, 31, 528/32; 525/478

[56] References Cited

U.S. PATENT DOCUMENTS

| | | | |
|---|---|---|---|
| 3,398,175 | 8/1968 | Leitheiser | 528/35 |
| 4,202,807 | 5/1980 | Moretto | 260/29.1 SB |
| 4,233,427 | 11/1980 | Bargain et al. | 528/35 |
| 4,287,751 | 8/1981 | Hutt | 528/45 |
| 4,478,893 | 10/1984 | Schoenfelder | 427/387 |
| 4,518,758 | 5/1985 | Cavezzan | 528/28 |

Primary Examiner—Melvyn I. Marquis
Attorney, Agent, or Firm—William C. Townsend

[57] ABSTRACT

A high temperature, high impact, erosion resistant silphenylene-vinylmethylsiloxane elastomer and a process for making the same in which a liquid hydroxyl-terminated silphenylene vinylmethylsiloxane polymer is cured using a combination of hydrosilylation cure and urethane cure techniques.

8 Claims, No Drawings

HIGH TEMPERATURE INSULATORS

BACKGROUND OF THE INVENTION

1. Field of the Invention

The invention relates to ablative high-temperature elastomers. More particularly, this invention relates to dual-cure silphenylene-methylvinylsiloxane polymers.

2. Description of the Prior Art

Methylphenylsiloxane polymer binders containing fillers of silica, silicon carbide, and carbon fiber are useful as char-forming ablative high temperature insulators. Under certain types of severe heating these insulators undergo blistering and spalling. Blistering and spalling can be avoided by using ablative insulators containing polymer binders of greater thermal stability. Fluorocarbon elastomers such as fluorocarbon-ether-linked polyheterocyclic elastomers have greater thermal stability than methylphenylsiloxane polymers but fluorocarbons are not char-forming ablators.

Silphenylene-siloxane copolymers have greater thermal stability than methylphenylsiloxane polymers as well as suitable char-forming properties. However, to achieve precure viscosity sufficiently low to produce flowable materials when fillers and fibers are added, a relative short chain length polymer is required. The short chain length polymer is detrimental to good mechanical properties required for erosive flow resistance. Modifications of silphenylene-siloxane copolymer mechanical properties are needed before the copolymers can be useful in char-forming ablative high temperature insulators.

Modification of organopolysiloxane compositions with polyurethane is a known method of improving mechanical properties. Block copolymers comprising polysiloxane and urethane segments are known. Polysiloxane mixtures filled with polyurethane are also known. These mixtures are characterized as having a coherent phase of an organopolysiloxane liquid and a non-coherent, discernable phase of polyurethane polymer, in some cases with partial chemical and/or physical bonding to one another. Both the polysiloxane/polyurethane block copolymers and the polyurethane filled polysiloxane have excellent elastic properties but poor thermal stability. The various polymers and processes of the prior art do not enable the modification of silphenylene-siloxane copolymers to improve the mechanical properties without compromising the desired high thermal stability.

SUMMARY OF THE INVENTION

Accordingly, an object of this invention is to provide an ablative, high-temperature silphenylene-vinylmethylsiloxane elastomer having good thermal stability as well as good mechanical properties.

Another object of this invention is a process for producing a high temperature, high impact, erosion resistant silphenylene-vinylmethylsiloxane elastomer.

These and other objects are demonstrated by high temperature, high impact, erosion resistant silphenylene-vinylmethylsiloxane elastomers of the present invention and a process for making the same in which liquid hydroxyl-terminated silphenylene-vinylmethylsiloxane polymers are cured using a combination of hydrosilylation cure and urethane cure techniques.

DETAILED DESCRIPTION OF THE INVENTION

According to the present invention, silphenylene-vinylmethylsiloxane polymers useful as elastomeric binders for ablative insulation having increased resistance to ablation and erosion in a high combustion gas velocity, high flux thermal environment are produced in a process involving dual hydrosilylation cure and urethane cure techniques.

Exactly alternating liquid silphenylene-siloxane polymers used in the present invention are prepared by the condensation of bis(dimethylamino)vinylmethylsilane with p-bis(hydroxydimethylsilyl)benzene. The liquid hydroxyl-terminated silphenylene vinylmethylsiloxane polymers have the general formula:

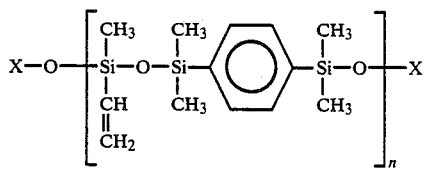

in which
X is selected from the group consisting of

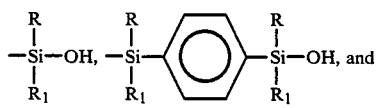

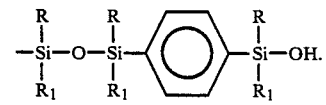

R is selected from the group consisting of alkyl radicals and hydrogen, $R_1$ is selected from the group consisting of alkyl radicals, alkylene radicals, and hydrogen, and n is a number of about 20.

The polymers are prepared by adding p-bis(hydroxydimethylsilyl)benzene to toluene and heating until the solid dissolved. Bis(dimethylamino)-vinylmethylsilane is added and the mixture is refluxed. The polymers are precipitated by adding a low molecular weight alcohol such as methanol. The solvent and alcohol is removed under vacuum. Table 1 describes the preparation of three exactly alternating hydroxyl-terminated silphenylene-vinylmethylsiloxane polymers and one hydridosilane-terminated polymer used in the present invention.

TABLE 1

Preparation of Silphenylene-Siloxane Polymers.

| Designation | p-diol,[a] g | Toluene, ml | Silane Type[b] | Silane Weight, g | Reflux time | Chain terminator Type[b] | Chain terminator Weight, g | Terminal group | Theoretical $M_n$ |
|---|---|---|---|---|---|---|---|---|---|
| NWC03145A | 32.94 | 48 | BDDMS | 20.21 | 39 min | $H_2O$ | 11 | Si—OH | 5649 |
| NWC03145B | 67.98 | 100 | BDDMS | 38.80 | 29 min | DSDA | 10 | Si—H | 2000 |
| NWC03155A | 46.76 | 70 | BDMVS | 31.08 | 30 min | $H_2O$ | 10 | Si—OH | 5890 |

TABLE 1-continued

Preparation of Silphenylene-Siloxane Polymers.

| | | | Silane | | | Chain terminator | | | |
|---|---|---|---|---|---|---|---|---|---|
| Designation | p-diol,[a] g | Toluene, ml | Type[b] | Weight, g | Reflux time | Type[b] | Weight, g | Terminal group | Theoretical $M_n$ |
| NWC03195A | 154.04 | 228 | BDMVS | 102.24 | 1 hr 22 min | H₂O | 25 | Si—OH | 5890 |

[a]p-diol is p-bis(hydroxydimethylsilyl)benzene.
[b]Designation of silanes:
BDDMS: bis(dimethylamine)dimethylsilane; used to prepare silphenylene-DMS polymers.
BDMVS: bis(dimethylamine)methylvinylsilane; used to prepare silphenylene-VMS polymers.
DSDA: dimethylsilyldimethylamine; used to provide hydridosilane end groups.

Three polymers of Table 1 have a high vinyl content and silanol termination. These polymers are cured by a dual-cure technique which uses a polyurethane cure in conjunction with a hydrosilylation cure. In the hydrosilylation cure, a hydrosilylation cross-linker such as hexamethyltrisiloxane combines with the vinyl moieties of the polymer. In the urethane cure, a urethane cross-linker such as tris-isocyanate hexyldiurea combines with the silanol end groups of the polymer. The polyurethanes have excellent elastomeric properties but poor thermal stability. Vinyl cross-linking by hydrosilylation has been shown to possess excellent thermal stability but poor elastomeric properties. The dual cure technique of the present invention provides both thermally stable vinyl crosslinking by hydrosilylation and elastomeric polyurethane bonds.

Exactly alternating hydroxyl-terminated silphenylene-vinylmethylsiloxane polymers are dual-cured in a polytetrafluroethylene-coated aluminum foil container. The polymer, hydridosilane cross-linker and urethane cross-linker are mixed and then a hydrosilylation curing catalyst and a urethane curing catalyst are added. The hydridosilane cross-linker may be selected from a variety of hydridosilane-terminated compounds such as hexamethyltrisiloxane and bis(dimethylsilyl)-benzene.

Additionally, a hydridosilane-terminated silphenylene-dimethylsiloxane polymer was prepared to serve as a hydrosilylation-type cross-linking agent that had about 10 times the molecular weight of most crosslinkers and a low viscosity. This crosslinker is listed as NWC 03145B in Table 1 and is the reaction product of bis(dimethylamine)-dimethylsilane and p-bis(hydroxyldimethylsilyl)benzene capped with dimethylsilyldimethylamine. The long cross-linker produced an elastomer with good elasticity.

In theory, the hydrosilylation reaction may be carried out in the absence of a catalyst, but catalyst is needed to obtain useful yields. The hydrosilylation cure catalyst used was a hexachloroplatinic acid/divinyltetramethylsiloxane complex containing about 3% by weight platinum. Other platinum catalysts in a siloxane base are expected to work well.

Multifunctional organo-isocyanate compounds are used as the urethane crosslinker. The trifunctional isocyanate tris-isocyanate hexyldiurea works well in the present invention. The urethane cure may be carried out either in the absence or presence of a catalyst. Any conventional catalyst which is well known in the chemistry of reactions between an isocyanate group and a hydroxyl group is suitable. Among these, the tin-II salts of carboxylic acids and the dialkyl-tin salts of carboxylic acids are particularly suitable. Dibutyltin dilaurate has been found to work well.

The reaction mixture was maintained at ambient temperature or heated to a temperature of about 100° C. for about 1 hour to about 5 hours. After the procedure was completed, observations were made and the Shore A hardness was measured. Details of the dual-cure procedure and results are described in Table 2.

TABLE 2

Urethane Curing and Urethane/Hydrosilylation Co-curing of Exactly Alternating Silphenylene-Siloxane Polymers.

| Experiment designation | Base polymer | Polymer weight, g | N100[a], g | T-12[b], g | Curing agent Type[c] | Weight, g | QCl[d], g | Cure Temperature, °F. | Time | Observations |
|---|---|---|---|---|---|---|---|---|---|---|
| P48-1 | NWC03145A | 10 | 0.70 | 0.01 | — | — | 0 | Ambient | 2 hr | Viscosity increase; no gel |
| P48-2 | NWC03155A | 10 | 0.66 | 0.03 | — | — | 0 | Ambient | 3 hr 26 min | Gelled |
| P50 | NWC03145A | 10 | 0.7 | 0.03 | — | — | 0 | Ambient | 1 hr 10 min | No cure |
| P52 | NWC03155A | 10 | 0 | 0 | HMTS | 0.53 | 0.03 | 140° F. | 50 min | Cured; somewhat triable |
| P56-1 | NWC03195A | 10 | 0.66 | 0.04 | — | — | — | Ambient | 4 hr 20 min | No cure |
| P56-2 | NWC03195A | 10 | 0 | 0 | HMTS | 0.53 | 0.02 | 140° F. | 30 min | Cured; triable, tacky |
| P58-1 | NWC03195A | 10 | 0.5 | 0.04 | — | — | — | Ambient | 1 hr | Cured; tacky |
| P58-2 | NWC03195A | 10 | 0.82 | 0.04 | — | — | — | Ambient | 1 hr | Cured; tacky |
| P60 | NWC03195A | 10 | 0.75 | 0.04 | HMTS | 0.53 | 0.02 | Ambient | 1 hr | Cured |
| P61 | NWC03195A | 10 | 1.0 | 0.04 | — | — | 0 | 140° F. | 1 hr 15 min | Cured; tacky |
| P61-1 | NWC03195A | 10 | 0.66 | 0.02 | HMTS | 0.4 | 0.02 | 140° F. | 1 hr 18 min | Cured; tacky |
| P63 | NWC03195A | 10 | 0.66 | 0.02 | HMTS | 0.43 | 0.02 | 140° F. | 1 hr | Cured; Shore A of 50 |
| P64 | NWC03195A | 10 | 0.66 | 0.002 | HMTS | 0.43 | 0.02 | 140° F. | 1 hr | Cured |
| P66 | NWC03195A | 10 | 0.68 | 0.002 | HMTS | 0.43 | 0.002 | 140° F. | 1 hr | Cured; tacky |
| P67 | NWC03195A | 10 | 0.87 | 0.02 | HMTS | 0.43 | 0.02 | 140° F. | 1 hr | Cured; Shore A of 34 |
| P69 | NWC03195A | 10 | 0.68 | 0.02 | HMTS | 0.43 | 0.02 | 200° F. | 1 hr | Cured; Shore A of 44 |
| P71 | NWC03195A | 10 | 0.58 | 0.02 | HMTS | 0.43 | 0.03 | 140° F. | 4 hr 35 min | Cured; tacky |
| P73 | NWC03195A | 10 | 0.87 | 0.02 | HMTS | 0.33 | 0.03 | 140° F. | 4 hr 27 min | Cured; tacky |

TABLE 2-continued
Urethane Curing and Urethane/Hydrosilylation Co-curing of Exactly Alternating Silphenylene-Siloxane Polymers.

| Experiment designation | Base polymer | Polymer weight, g | N100[a], g | T-12[b], g | Curing agent Type[c] | Weight, g | QCl[d], g | Cure Temperature, °F. | Time | Observations |
|---|---|---|---|---|---|---|---|---|---|---|
| P74 | NWC03195A | 10 | 0 | 0 | NWC03145B | 5 | 0.04 | 140° F. | 45 min | Cured; tacky |

[a] N100 is a trifunctional isocyanate.
[b] T-12 is a urethane curing catalyst as described at page 7, supra.
[c] HMTS is 1,1,3,3,5,5-hexamethyltrisiloxane.
[d] QCl is a solution of 3% chloroplatinic acid in cyclic vinylsiloxane The polymer NWC 03145A, a hydroxyl-terminated silphenylene-dimethylsiloxane was not successfully cured using the dual-cure technique. Polymer NWC 03195A, a hydroxyl-terminated silphenylene-vinylmethylsiloxane was cured by the urethane cure technique, the hydrosilylation cure technique, and by the dual cure technique. Polyurethane curing of the polymer was successful, but a sticky film was left on the surface. Hydrosilylation curing gave a product that was brittle and sticky. The best results were obtained using the dual cure technique. It should be noted that the tacky film left on the surface of samples P 69 and P 71 solidified after about 18 days at room temperature. Leaving the samples at 140° F. for 12 hours did not accelerate this behavior.

Thermogravimetric analysis and impact behavior were used to evaluate the elastomers of Table 2. Thermogravimetric analysis was done under argon at a temperature rise of 5° C. per minute. Impact behavior was determined by hitting the material once with a mallet. The results of the thermogravimetric analysis and impact behavior are presented in Table 3. The results are compared with a commercially available methylphenylsiloxane material, DC 93-104, available from the Dow Corning Corporation, Midland, Mich.

TABLE 3
THERMOGRAVIMETRIC ANALYSIS AND IMPACT BEHAVIOR

| Sample | Description | Impact Behavior | $T_1$ | $T_2$ | $T_{10}$ | $T_{20}$ (°C.) |
|---|---|---|---|---|---|---|
| P 61 | Urethane-Cure | No visible damage | 240 | 288 | 519 | 689 |
| P 74 | Long X-linker | Fibrous Fracture | 318 | 350 | 434 | 527 |
| P 60 | Dual-Cure | Fibrous Fracture | 269 | 295 | 549 | 652 |
| P 69 | Dual-Cure | Internal Fracture | 286 | 311 | 566 | 705 |
| P 69 | Dual-Cure | Internal Fracture | 290 | 324 | 571 | 708 |
| P 69 | Dual-Cure | Internal Fracture | 295 | 312 | 563 | 703 |
| DC 93-104 | Unfilled | Internal Fracture | 208 | 230 | 389 | 447 |

Sample P 69 equaled unfilled DC 93-104 in impact resistance while exceeding its thermogravimetric performance. Two other formulations exhibited desirable impact properties as well as superior thermogravimetric performance. Multiple Differences in the two dual-cure samples, P 60 and P 69, were the amount of crosslinker and catalyst used to cure the system. The second sample used less crosslinker to increase fracture toughness and a diluted catalyst to increase pot life.

Good impact resistance is considered indicative of good ablative/erosive flow properties. Polymers containing high amounts of vinyl such as vinylmethylsiloxanes are expected to produce a smooth or glassy fracture pattern indicating little energy is absorbed and poor fracture toughness. In contrast, vinylmethylsiloxane materials produced by the dual-cure process of the present invention were tough enough to withstand several mallet blows before starting to crumble. Moreover, the dual-cured materials exhibited fibrous fractures or internal fractures of a fibrous nature. This indicates the mterials absorb a considerable amount of energy by creating new surface area and that the materials have a good fracture toughness or resistance to crack propagation.

Modifications and variations of the present invention are possible. It should be understood that, within the scope of the appended claims, the invention may be practiced otherwise than as specifically described.

What is claimed is:

1. A process for producing a high temperature, high impact, erosion resistant silphenylene-vinylmethylsiloxane elastomer comprising a liquid hydroxyl-terminated silphenylene vinylmethylsiloxane polymer cured using a combination of hydrosilylation cure and urethane cure techniques comprising mixing at a temperature from about room temperature to about 100° C. a liquid hydroxyl-terminated silphenylene vinylmethylsiloxane polymer of the formula:

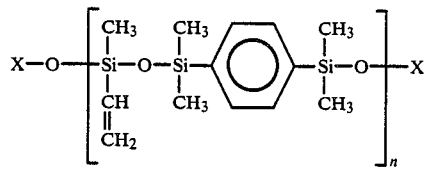

in which
X is selected from the group consisting of

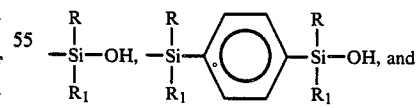

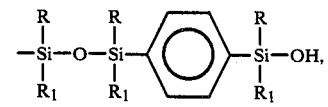

R is selected from the group consisting of alkyl radicals and hydrogen,
$R_1$ is selected from the group consisting of alkyl radicals, alkylene radicals, and hydrogen, and
n is a number of about 20, with a hydrosilylation cross-linker and a multifunctional organic isocyanate urethane curative.

2. The process of claim 1 in which said hydrosilylation cross-linker is selected from the group consisting of 1,1,3,3,5,5-hexamethyltrisiloxane, and the reaction product of condensation of p-bis(hydroxydimethylsilyl)benzene with bis(dimethylamine)dimethylsilane.

3. The process of claim 1 wherein said urethane curative is tris-isocyanate hexyldiurea.

4. The process of claim 1 wherein a urethane cure catalyst is added to said composition, said catalyst selected from the group consisting of tin-II salts of carboxylic acids, and dialkyl-tin salts of carboxylic acids.

5. The process of claim 1 wherein a solution of chloroplatinic acid in a siloxane base is added to said composition as a hydrosilylation cure catalyst.

6. The product produced by the process of claim 1 in which the liquid hydroxyl-terminated silphenylene vinylmethylsiloxane polymer is cured using a combination of a hydrosilylation cure and a urethane cure techniques.

7. The product produced by the process of claim 2 in which a liquid hydroxyl-terminated silphenylene vinylmethylsiloxane polymer is cured using a combination of a hydrosilylation cure and a urethane cure techniques.

8. The product produced by the process of claim 3 in which a liquid hydroxyl-terminated silphenylene vinylmethylsiloxane polymer is cured using a combination of a hydrosilylation cure and a urethane cure techniques.

* * * * *